United States Patent [19]
Meier

[11] Patent Number: 5,403,533
[45] Date of Patent: Apr. 4, 1995

[54] PROCESS FOR LINING A TUBE

[75] Inventor: Dieter Meier, Gottingen, Germany

[73] Assignee: Fischer & Porter Company, Warminster, Pa.

[21] Appl. No.: 675,457

[22] Filed: Mar. 26, 1991

[51] Int. Cl.⁶ .................. B29C 63/04; B29C 65/70
[52] U.S. Cl. ............................. 264/249; 264/269
[58] Field of Search ............ 264/249, 328.1, 267, 264/269, 328.14, 294, 296; 425/509, 515

[56] References Cited

U.S. PATENT DOCUMENTS

| | | |
|---|---|---|
| 3,047,937 | 8/1962 | de Vecchi . |
| 3,435,853 | 4/1969 | Weeden et al. . |
| 3,959,424 | 5/1976 | Dawson et al. ............ 264/249 |
| 4,124,675 | 11/1978 | McFarlane ............ 264/249 |
| 4,191,305 | 3/1980 | Davis . |
| 4,198,365 | 4/1980 | Pelton ............ 264/249 |
| 5,094,795 | 3/1992 | McMillan et al. ............ 264/249 |
| 5,105,524 | 4/1992 | Darling ............ 264/249 |

FOREIGN PATENT DOCUMENTS

827550 1/1952 Germany .

*Primary Examiner*—Jan H. Silbaugh
*Assistant Examiner*—Angela Ortiz
*Attorney, Agent, or Firm*—Ratner & Prestia

[57] ABSTRACT

A measuring tube for a flowmeter and a process for making the measuring tube. The measuring tube is lined with a tubular lining of thermoplastic material, particularly PTFE or PFA, which comes into contact with the measured substance which flows through the tube. The ends of the tubular lining are flanged around end flanges of the measuring tube after the ends of the tubular lining have been plasticised by heating. The plasticised ends of the tubular lining are turned outward by more than 90° and then forced into undercuts in the end faces of the end flanges. Upon cooling, the ends of the lining are in intimate contact with the end faces of the end flanges and the undercuts in the end faces.

4 Claims, 1 Drawing Sheet

PROCESS FOR LINING A TUBE

TECHNICAL FIELD

The present invention relates, in general, to lining fluid-carrying tubes and, in particular, to a process for lining the measuring tube of a flowmeter and the article made by this process.

BACKGROUND OF THE INVENTION

In a known process of this kind, the ends of the tubular lining are heated and flanged onto sealing strips which are located on the end faces of the end flanges and which encircle the measuring tube. After the flanging, the flanged ends of the lining have a tendency to return to their original tubular shape, with the result that they detach themselves from the sealing strips. This frequently leads to damage when the measuring tube is installed.

SUMMARY OF THE INVENTION

The aim of the present invention is to provide a process and an article made by the process by which the flanged ends of the tubular lining do not detach themselves from the end flanges after the flanging process.

As a result of the fact that the ends of the tubular lining are opened out by more than 90° by heating after the plasticisation, annular forces are produced in the ends which cause the ends to shrink, as they cool, around the non-widened portions of the tubular lining.

If the flanging is carried out in undercuts on the end faces of the end flanges, the ends of the tubular lining can no longer detach themselves from the end flanges.

BRIEF DESCRIPTION OF THE DRAWING

The present invention is hereinafter described with reference to embodiments by way of example, referring to the accompanying drawings.

DETAILED DESCRIPTION OF THE INVENTION

Figure 1:
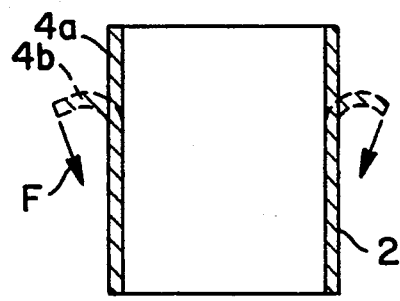
FIG. 1 explains the process of widening by more than 90 in accordance with the present invention.

FIG. 1 shows an end portion of a tubular thermoplastic lining 2 (i.e. PTFE or PFA (perfluoroalkoxy compounds) with an end 4a which has not yet been everted (i.e. opened out) and an end 4b which has been opened out by more than 90° after plasticising, for example, by heating. When the opened out end 4b cools, forces are produced in the direction of the arrow F which draw the free edge of the tubular lining radially inward and ensure a secure hold for a flanged connection.

Figure 2:
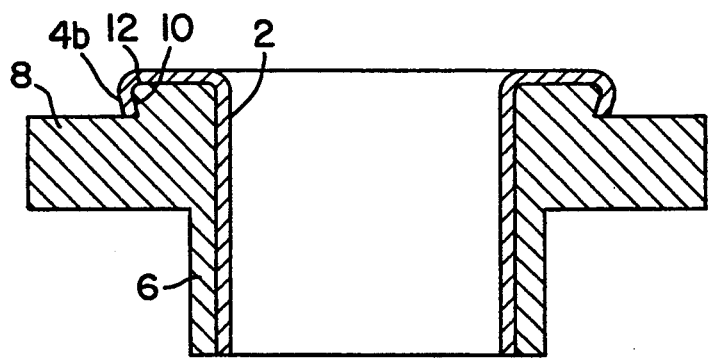
FIG. 2 shows a first embodiment of a flanging in accordance with the present invention.

FIG. 2 shows an end portion of a measuring tube 6 with an end flange 8 which has an acute-angled undercut 10. The outer edge 12 or contact surface of the undercut 10 is rounded. The end 4b according to FIG. 1 is flanged into the undercut 10. As shown by FIG. 2, lining 2 is of lesser thickness than measuring tube 6.

Figure 3:
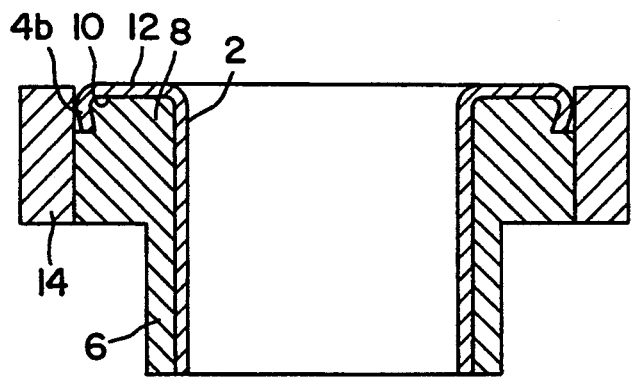
FIG. 3 shows a second embodiment of the present invention with an additional securing of the flange connection.

In the embodiment according to FIG. 3, the end flange 8 radially adjoins the undercut 10, so that precisely the flanged end 4b of the tubular lining 2 has room in the undercut 10. In order to secure the end 4b even more, the end flange 8 is enclosed by an annular mounting 14 which forces the end 4b of the tubular lining 2 into the undercut 10.

Figure 4:
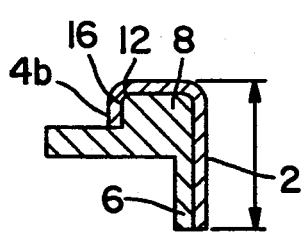
FIGS. 4, 5 and 6 show different undercuts made in the end faces of the end flanges of a flowmeter tube in accordance with the present invention.

FIG. 4 shows a right-angled undercut 16 in the end flange 8.

Figure 5:
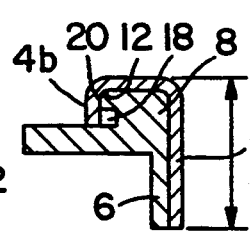

FIG. 5 shows an inwardly directed annular groove 18 in which an undercut 20 ends.

Figure 6:
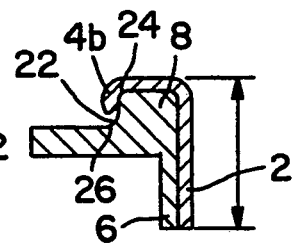

FIG. 6 shows a substantially acute angled undercut 22, the outer edge 24 and inner edge 26 of which are rounded.

The process for lining the flowmeter measuring tube includes supplying the flowmeter measuring tube having a longitudinal axis and end face with an opening therein, a first surface extending radially outward from the opening, and a second surface spaced longitudinally from and connected to the first surface by a surface forming a circumferential undercut in the end face, the second surface extending radially outward from the undercut; placing the tubular lining of thermoplastic material within the flowmeter measuring tube with a selected length of the tubular lining extending beyond the end face of the flowmeter measuring tube; plasticising at least the selected length of the tubular lining; opening out the plasticised length of the tubular lining over the end face of the flowmeter measuring tube by more than 90° from the longitudinal axis of the flowmeter measuring tube and pushing a free edge of the plasticised length of the tubular lining into the circumferential undercut; and permitting the opened out plasticised length of tubular lining to solidify and the free edge of the opened out plasticised length of the tubular lining to be drawn by shrinkage radially inward into intimate contact with the circumferential undercut in the end face of the flowmeter measuring tube, so that the lining is securely held and will not detach itself from the flowmeter measuring tube.

What is claimed:

1. A process for lining a flowmeter measuring tube comprising the steps of:
   supplying a flowmeter measuring tube having a longitudinal axis and an end face with an opening therein, a first surface extending radially outwardly from said opening, and a second surface spaced longitudinally from and connected to said first surface by a surface forming a circumferential undercut in said end face, said second surface extending radially outwardly from said undercut;
   then placing a tubular lining of thermoplastic material, of lesser thickness than said flowmeter measuring tube, within said flowmeter measuring tube with a selected length of said tubular lining extending beyond said end face of said flowmeter measuring tube;
   plasticising at least said selected length of said tubular lining;
   opening out said plasticised length of said tubular lining over said end face of said flowmeter measuring tube by more than 90° from said longitudinal axis of said flowmeter measuring tube and pushing a free edge of said plasticised length of said tubular lining into said circumferential undercut in said end face;
   and permitting:
   (a) said opened out plasticised length of said tubular lining to solidify, and (b) the free edge of said opened out plasticised length of said tubular lining to be drawn by shrinkage radially inward into intimate contact with said circumferential undercut in said end face of said flowmeter measuring tube, thereby lining said flowmeter measuring tube with a securely held lining, which will not detach itself from said flowmeter measuring tube.

2. A process according to claim 1 wherein said plasticising is by heating and said solidifying is by cooling.

3. A process according to claim 2 wherein said tubular lining material is PTFE.

4. A process according to claim 2 wherein said tubular lining material is PFA.

* * * * *